US012651441B2

(12) United States Patent
Yoo et al.

(10) Patent No.: US 12,651,441 B2
(45) Date of Patent: Jun. 9, 2026

(54) METHOD AND APPARATUS FOR GENERATING AN ADAPTIVE TRAINING IMAGE DATASET

(71) Applicant: SEMES CO., LTD., Chungcheongnam-do (KR)

(72) Inventors: Ji Hoon Yoo, Gyeonggi-do (KR); Kwang Sup Kim, Chungcheongnam-do (KR); Jong Min Lee, Gyeonggi-do (KR); Yeon Chul Song, Seoul (KR); Jun Ho Oh, Gyeonggi-do (KR); Young Ho Park, Incheon (KR); Myeong Jun Lim, Gyeonggi-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 607 days.

(21) Appl. No.: 17/848,389

(22) Filed: Jun. 24, 2022

(65) Prior Publication Data

US 2023/0138430 A1 May 4, 2023

(30) Foreign Application Priority Data

Oct. 29, 2021 (KR) ........................ 10-2021-0147081

(51) Int. Cl.
*G06V 10/774* (2022.01)
*G06T 7/00* (2017.01)
(Continued)

(52) U.S. Cl.
CPC ........ *G06V 10/7747* (2022.01); *G06T 7/0004* (2013.01); *G06V 10/764* (2022.01); *G06V 10/776* (2022.01); *G06T 2207/30144* (2013.01)

(58) Field of Classification Search
CPC ............ G06V 10/7747; G06V 10/764; G06V 10/776; G06V 10/761; G06V 10/774;
(Continued)

(56) References Cited

U.S. PATENT DOCUMENTS

2021/0295213 A1* 9/2021 Raveh .................. G06V 10/764

FOREIGN PATENT DOCUMENTS

CN       107451597       12/2017
CN       110458217       11/2019
(Continued)

OTHER PUBLICATIONS

Office Action (1st) dated Dec. 23, 2025 for Chinese Patent Application No. 202210707954.0 and Its English translation provided by Applicant's foreign counsel/Global Dossier.

*Primary Examiner* — Matthew C Bella
*Assistant Examiner* — Andrew B. Jones
(74) *Attorney, Agent, or Firm* — WOMBLE BOND DICKINSON (US) LLP

(57) ABSTRACT

A method for generating an adaptive training image dataset capable of improving prediction accuracy is provided. The method comprises preparing a first image dataset, wherein the first image dataset includes a plurality of first images and a first class corresponding to each of the plurality of first images, performing a learning algorithm on the first image dataset to generate a first learning model, preparing a second image dataset, wherein the second image dataset includes a plurality of second images and a second class corresponding to each of the plurality of second images, inputting the second image to the first learning model to obtain a prediction class corresponding to the second image, determining which class of image the second image is similar to in case of the second class corresponding to the second image being different from the prediction class, updating the second image dataset by updating a class corresponding to the second image according to the determination result, and performing a learning algorithm on the first image dataset and the updated second image dataset to generate a second learning model.

8 Claims, 5 Drawing Sheets

(51) Int. Cl.
    *G06V 10/764*     (2022.01)
    *G06V 10/776*     (2022.01)

(58) Field of Classification Search
    CPC .................. G06V 10/82; G06T 7/0004; G06T
                   2207/30144; G06T 2207/20081; G06T
                   2207/20084; G06T 2207/30164; G06T
                   7/0002; G06N 20/20; G06N 5/025
    See application file for complete search history.

(56)                  References Cited

FOREIGN PATENT DOCUMENTS

| | | | | | |
|----|------------------|-----|----|---------|--------------|
| CN | 111507419 | A | * | 8/2020 | G06K 9/6256 |
| CN | 112183603 | B | * | 11/2024 | G06F 18/214 |
| JP | 2021057820 | A | * | 4/2021 | G06N 3/08 |
| KR | 10-2020-0092450 | | | 8/2020 | |
| KR | 10-2020-0135730 | | | 12/2020 | |
| KR | 10-2021-0020976 | | | 2/2021 | |
| KR | 10-2021-0063313 | | | 6/2021 | |

* cited by examiner

METHOD AND APPARATUS FOR GENERATING AN ADAPTIVE TRAINING IMAGE DATASET

This application claims the benefit of Korean Patent Application No. 10-2021-0147081, filed on Oct. 29, 2021, in the Korean Intellectual Property Office, the disclosure of which is incorporated herein by reference in its entirety.

BACKGROUND

1. Field

The present invention relates to a method and apparatus for generating an adaptive training image dataset.

2. Description of the Related Art

The prediction accuracy of a learning model generated by machine learning (i.e., deep learning) is affected by the configuration of the training dataset, the model architecture, and the number of training iterations. In particular, the configuration of the training dataset has the greatest influence on the prediction accuracy.

The training dataset includes training data and a class corresponding to the data. That is, the user may create a training dataset by performing a labeling operation to identify which class the training data belongs to.

SUMMARY

Typically, the training dataset is configured as designed in advance, so it is used as an input value for a learning algorithm without additional verification.

However, in the manufacturing field, it is difficult to define a class in advance and perform a labeling operation accordingly, unlike the configuration of a typical training dataset. This is because it is difficult to predict what type of defects will occur before the equipment is operated. In addition, even if a class is defined in advance and a labeling operation is performed according to the class, when a plurality of users perform the labeling operation, the subjectivity of each of the plurality of users is reflected. Therefore, it is necessary to verify the completed training dataset. To verify the completed training dataset as described above, a lot of money and man-hours are required.

An object of the present invention is to provide a method and apparatus for generating an adaptive training image dataset, which can improve prediction accuracy.

The objects of the present invention are not limited to the objects mentioned above, and other objects not mentioned will be clearly understood by those skilled in the art from the following description.

One aspect of the method of generating an adaptive training image dataset of the present invention for achieving the above object comprises preparing a first image dataset, wherein the first image dataset includes a plurality of first images and a first class corresponding to each of the plurality of first images, performing a learning algorithm on the first image dataset to generate a first learning model, preparing a second image dataset, wherein the second image dataset includes a plurality of second images and a second class corresponding to each of the plurality of second images, inputting the second image to the first learning model to obtain a prediction class corresponding to the second image, determining which class of image the second image is similar to in case of the second class corresponding to the second image being different from the prediction class, updating the second image dataset by updating a class corresponding to the second image according to the determination result, and performing a learning algorithm on the first image dataset and the updated second image dataset to generate a second learning model.

Another aspect of the method of generating an adaptive training image dataset of the present invention for achieving the above object comprises preparing a verification image dataset, wherein the verification image dataset includes a plurality of verification images and a manual class, in which an operator classifies each of the plurality of verification images, inputting a verification image to a learning model to obtain a prediction class corresponding to the verification image, calculating a first similarity between a representative image of the prediction class and the verification image, and calculating a second similarity between a representative image of the manual class and the verification image in case of the prediction class and the manual class being different, updating the verification image dataset by updating a class corresponding to the verification image to the prediction class in case of the first similarity being greater than the second similarity, and reinforcing the learning model by performing a learning algorithm on the updated verification image dataset.

One aspect of the apparatus of the present invention for achieving the above object comprises a processor, and a memory, wherein the memory stores a first image dataset and a second image dataset, wherein the first image dataset includes a plurality of first images and a first class corresponding to each of the plurality of first images, wherein the second image dataset includes a plurality of second images and a second class corresponding to each of the plurality of second images, wherein the memory stores instructions that cause the processor to perform operations comprising, performing a learning algorithm on the first image dataset to generate a first learning model, inputting the second image to the first learning model to obtain a prediction class corresponding to the second image, determining which class of image the second image is similar to in case of the second class corresponding to the second image being different from the prediction class, updating the second image dataset by updating a class corresponding to the second image according to the determination result, generating a second learning model by performing a learning algorithm on the first image dataset and the updated second image dataset.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
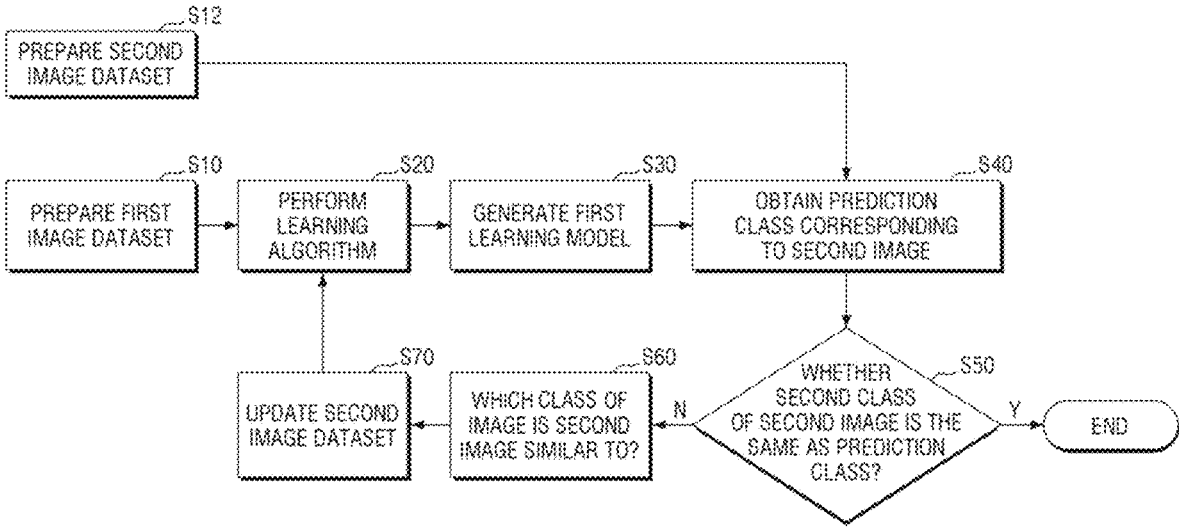
FIG. 1 is a block diagram illustrating a method of generating an adaptive training image dataset according to some embodiments of the present invention.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

Figure 2:
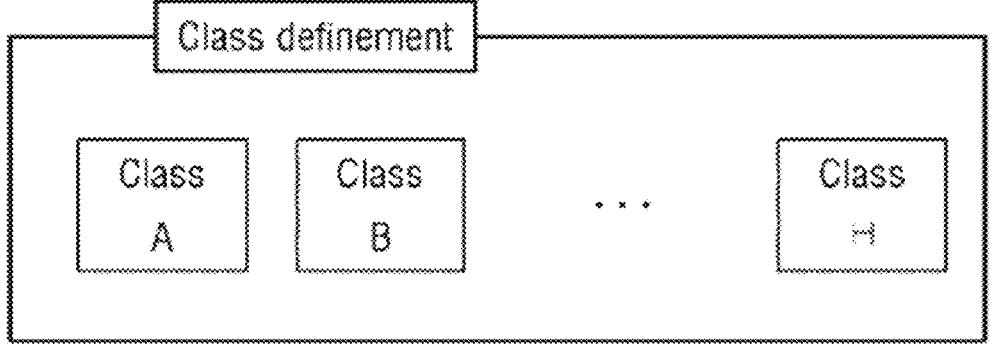
FIGS. 2 and 3 are diagrams for describing an example of step S10 of FIG. 1.
Figure 3:
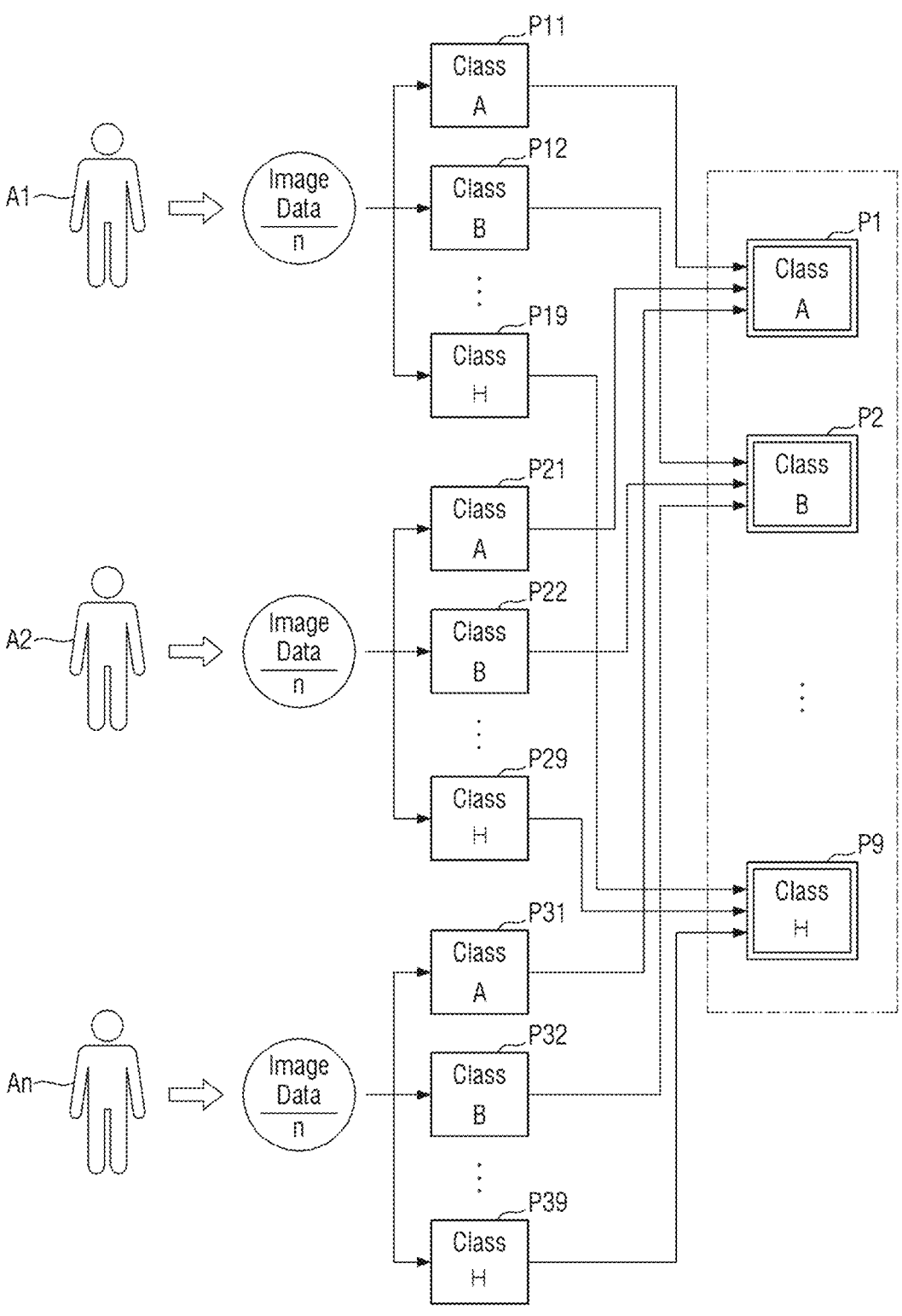
Figure 4:
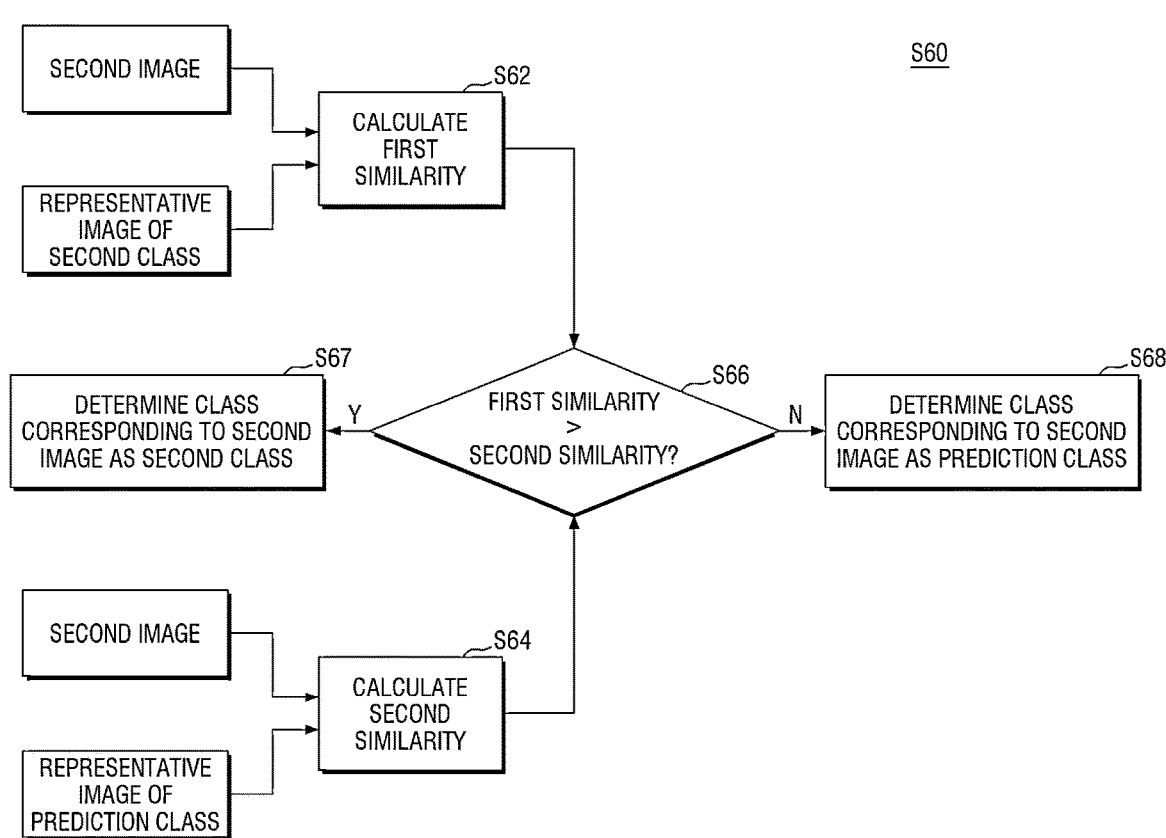
FIG. 4 is a diagram for describing an example of step S60 of FIG. 1.

FIG. 1 is a block diagram illustrating a method of generating an adaptive training image dataset according to some embodiments of the present invention. FIGS. 2 and 3 are diagrams for describing step S10 of FIG. 1. FIG. 4 is a diagram for describing an example of step S60 of FIG. 1.

Referring to FIG. 1, a first image dataset is prepared (S10).

That is, by classifying the plurality of first images by class, a first image dataset including the plurality of first images and classes corresponding to each of the plurality of first images is configured.

Referring to FIGS. 2 and 3, a class to be first classified is defined as shown in FIG. 2. For example, a class can be defined from Class A to Class H.

If the plurality of first images are, for example, ink ejection images by an inkjet equipment, the defined class may indicate a defect type. The defect types may include, for example, good products, dents, linear smears, satellite droplets, nozzle contamination, peripheral scratches, complex defects, and the like (see Table 1). In Table 1, 8 classes are classified, but this is only an example. Class A indicates good products, and the remaining classes (Class B~Class H) classify defective products more specifically. In addition, representative images of each class (Class A~Class H) are prepared in advance. The representative image intuitively informs the operator of what each class (Class A to Class H) means, and can be used when calculating the similarity to be described later (see S62 and S64).

TABLE 1

| Class | Definition |
| --- | --- |
| Class A | Good product |
| Class B | Deformation(dent) |
| Class C | Linear smears |
| Class D | Satellite droplet |
| Class E | Nozzle contamination |
| Class F | Peripheral scratch |
| Class G | Complex defect |
| Class H | Etc. (items other than classification) |

Subsequently, as shown in FIG. 3, the operators A1 to An divide the plurality of first images and classify them into appropriate classes. For example, if there are m first images, each of the n operators A1 to An may classify m/n first images.

The operator A1 classifies the m/n first images into class A (P11), class B (P12) to class H (P19). Similarly, the operator A2 classifies the m/n first images into class A (P21), class B (P22) to class H (P29). The operator An classifies the m/n first images into class A (P31), class B (P32) to class H (P39).

The first images classified by the plurality of operators A1 to An are collected by class. That is, the first images collected in class A (P11), class A (P21), and class A (P31) are merged into class A (P1). The first images collected in class B (P12), class B (P22), and class B (P32) are merged into class B (P2). The first images collected in Class H (P19), Class H (P29), and Class H (P39) are merged into Class H (P9).

As described above, the plurality of first images are classified by class. As a result, a first image dataset including a plurality of first images and a class corresponding to each first image is prepared. Hereinafter, a class corresponding to the first image may be referred to as a "first class," and the first class may refer to one of the aforementioned classes A to H. In addition, as shown in FIG. 2, the class classified by the operators A1 to An is referred to as a "manual class." The manual class may also refer to one of the aforementioned classes A to H.

Referring again to FIG. 1, a learning algorithm is performed on the first image dataset (S20). According to the result of the learning algorithm, a first learning model is generated (S30).

The learning algorithm used herein is not limited to a particular scheme. Examples of the learning algorithm include an artificial neural network (ANN), a deep neural network (DNN), a convolution neural network (CNN), and a recurrent neural network (RNN).

Meanwhile, a second image dataset is prepared (S12).

A method of preparing the second image dataset is substantially the same as described with reference to FIGS. 2 and 3. That is, the plurality of operators divide the plurality of second images and classify them into appropriate classes. For example, if there are k second images, each of n operators may classify k/n second images. The second images classified by the plurality of operators A1 to An are collected by class. As a result, a second image dataset including a plurality of second images and a class corresponding to each second image is prepared. Hereinafter, a class corresponding to the second image is referred to as a "second class." The second class may refer to one of the aforementioned classes A to H.

Meanwhile, the preparation of the second image dataset may be prepared together with the preparation of the first image dataset. For example, after a large number of operators perform class classification on 1200 images, a first image dataset may be created with 1000 images and corresponding classes, and the second image data may be created with the remaining 200 images and corresponding classes.

Alternatively, the preparation of the second image dataset may be performed at a time different from that of preparing the first image dataset. For example, 1000 images are obtained at a certain point in time (i.e., the first time point) while operating the inkjet equipment, and the operator performs class classification on them to create a first image dataset. Thereafter, while the inkjet equipment is additionally operated, 2000 images are obtained at another point in time (i.e., the second time point), and the operator may classify them to create a second image dataset.

Next, a plurality of second images are input to the first learning model, and a prediction class corresponding to each of the plurality of second images is obtained (S40).

When a second image is input to the first learning model, the first learning model notifies what class the second image corresponds to (i.e., to which of class A to class H it belongs). A class derived by the first learning model is referred to as a "prediction class."

As a result, for each of the plurality of second images, a manual class designated by the operator (i.e., a second class) and a class derived by the first learning model (i.e., a prediction class) are generated.

Next, for each of the plurality of second images, it is determined whether the second class and the prediction class are the same (S50).

If the second class and the prediction class are the same as each other (Y in S50), the class corresponding to the second image is determined as a manual class without needing to determine which class of image the second image is similar to.

On the other hand, if the second class and the prediction class are different from each other (N in S50), it is determined which class of image the second image is similar to (S60).

For example, the operator classifies a certain second image as Class D (satellite droplet defect), but the first learning model may classify the second image as Class B (dent defect). That is, the second class of the second image is Class D, and the prediction class is Class B. As such, when the second class of a certain second image and the prediction class are different from each other, it is determined whether the second image is similar to the second class or similar to the prediction class.

Here, referring to FIG. 4, a similarity (hereinafter, a first similarity) between the representative image of the second class and the second image is calculated (S62).

As described above, representative images of each of all classes (e.g., Class A to Class H in Table 1) are prepared in advance.

Calculating the first similarity may use various methods. The method described below is merely an example, and various other methods for calculating the similarity may be used.

As an example, as the first similarity, a Structural Similarity Index Map (S SIM) may be calculated.

The SSIM is a method designed to evaluate human visual quality differences and similarities, not numerical errors. Since the human visual system is specialized in deriving the structural information of an image, the degree of distortion of the structural information may have a great effect on perception. Therefore, SSIM compares the luminance (l), contrast (c), and structure (s) of two images, and the formula for calculating the SSIM is Equation 1.

In Equation 1, the representative image of the second class is f, the second image is g, the image size is M×N, $\mu_f$ is the average brightness of f, $\mu_g$ is the average brightness of g, $\sigma_f$ is the standard deviation of f, $\sigma_g$ is the standard deviation of g, $\sigma_{fg}$ is the covariance between f and g, and C1, C2, C3 are constants.

$$SSIM(f, g) = l(f, g)c(f, g)s(f, g) \qquad \text{[Equation 1]}$$

$$\text{where } l(f, g) = \frac{2\mu_f\mu_g + C_1}{\mu_f^2 + \mu_g^2 + C_1}$$

$$c(f, g) = \frac{2\sigma_f\sigma_g + C_2}{\sigma_f^2 + \sigma_g^2 + C_2}$$

$$s(f, g) = \frac{\sigma_{fg} + C_3}{\sigma_f\sigma_g + C_3}$$

As another example, as the first similarity, a Peak Signal-to-Noise Ratio (PSNR) may be calculated.

The PSNR refers to the ratio of noise to the maximum signal that a signal can have. The formula for calculating PSNR is Equation 2.

Equation 2 is an example where the value obtained by subtracting the minimum value from the maximum value in the image is 255. For example, in the case of an 8-bit gray image, 255 is obtained by subtracting the minimum value (0) from the maximum value (255).

MSE(f, g) corresponds to the average of the sum of squares of distances between the representative image f of the second class and the second image g. Since the image size of the representative image f and the second image g is M×N, the distance between the two images is measured for each pixel. That is, the distance $(f_{ij}-g_{ij})$ is measured while increasing i from 1 to M and increasing j from 1 to N. When the average of the sum of squares of the measured distances is calculated, MSE(f, g) is obtained.

$$PSNR(f, g) = 10\log_{10}\left(\frac{255^2}{MSE(f, g)}\right) \qquad \text{[Equation 2]}$$

$$\text{where } MSE(f, g) = \frac{1}{MN}\sum_{i=1}^{M}\sum_{j=1}^{N}(f_{ij} - g_{ij})^2$$

As another example, as the first similarity, a weighted sum of SSIM and PSNR may be calculated. That is, the first similarity may be calculated as Q1×SSIM+Q2×PSNR. Q1 is the weight of SSIM, and Q2 is the weight of PSNR. Each of Q1 and Q2 may be, for example, a real number greater than zero, Q1 and Q2 may be different from each other, or may be the same as each other. For example, when Q1=Q2=1, the first similarity is the sum of SSIM and PSNR.

Next, a similarity (hereinafter, second similarity) between the representative image of the prediction class and the second image is calculated (S64).

Calculating the second similarity may use the same method as calculating the first similarity. That is, as the second similarity, SSIM, PSNR, or a weighted sum of SSIM and PSNR may be used. In the above description and in Equations 1 and 2, as f, the representative image of the prediction class may be used instead of the representative image of the second class.

Next, the first similarity and the second similarity are compared (S66).

If the first similarity is greater than the second similarity (see Y in S66), the class corresponding to the second image is not changed. That is, the class corresponding to the second image is determined as the second class (S67).

If the first similarity is smaller than the second similarity (see N in S66), the class corresponding to the second image is changed to a prediction class and determined (S67).

In the above example, the operator classified a certain second image as Class D (satellite droplet defect) (i.e., the second class is Class D), but the first learning model classifies the second image as Class B (dent defect) (That is, the prediction class is Class B). In this case, if the first similarity is large, the class of the second image is determined as Class D, and if the second similarity is large, the class of the second image is determined as Class B.

Referring back to FIG. 1, the second image dataset is updated by reflecting the similarity determination results performed on the plurality of second images (see S60 and FIG. 4) (S70).

The class determined for each of the plurality of second images by the similarity determination is updated to a class corresponding to each of the plurality of second images. As a result, the second image dataset is newly updated.

Next, a learning algorithm is performed on the first image dataset and the updated second image dataset to generate a second learning model (S20). The newly generated second learning model is used to predict which class the input images correspond to. That is, when an ink ejection image is input to the second learning model, a result value (prediction class) indicating which defect type the ink ejection image has is output.

In summary, the second image dataset is updated through a verification process (i.e., similarity determination). Accordingly, the reliability of the second image dataset is increased. In addition, since the second learning model is a model generated using the verified second image dataset as described above, the prediction accuracy of the second learning model may be higher than that of the first learning model.

In addition, the verification process is not performed on all second images belonging to the second image dataset. Only when the prediction class is different from the preset class (i.e., the second class), the verification process is performed only on the corresponding second image. Therefore, relatively low cost and man-hours are required for the verification process.

Figure 5:
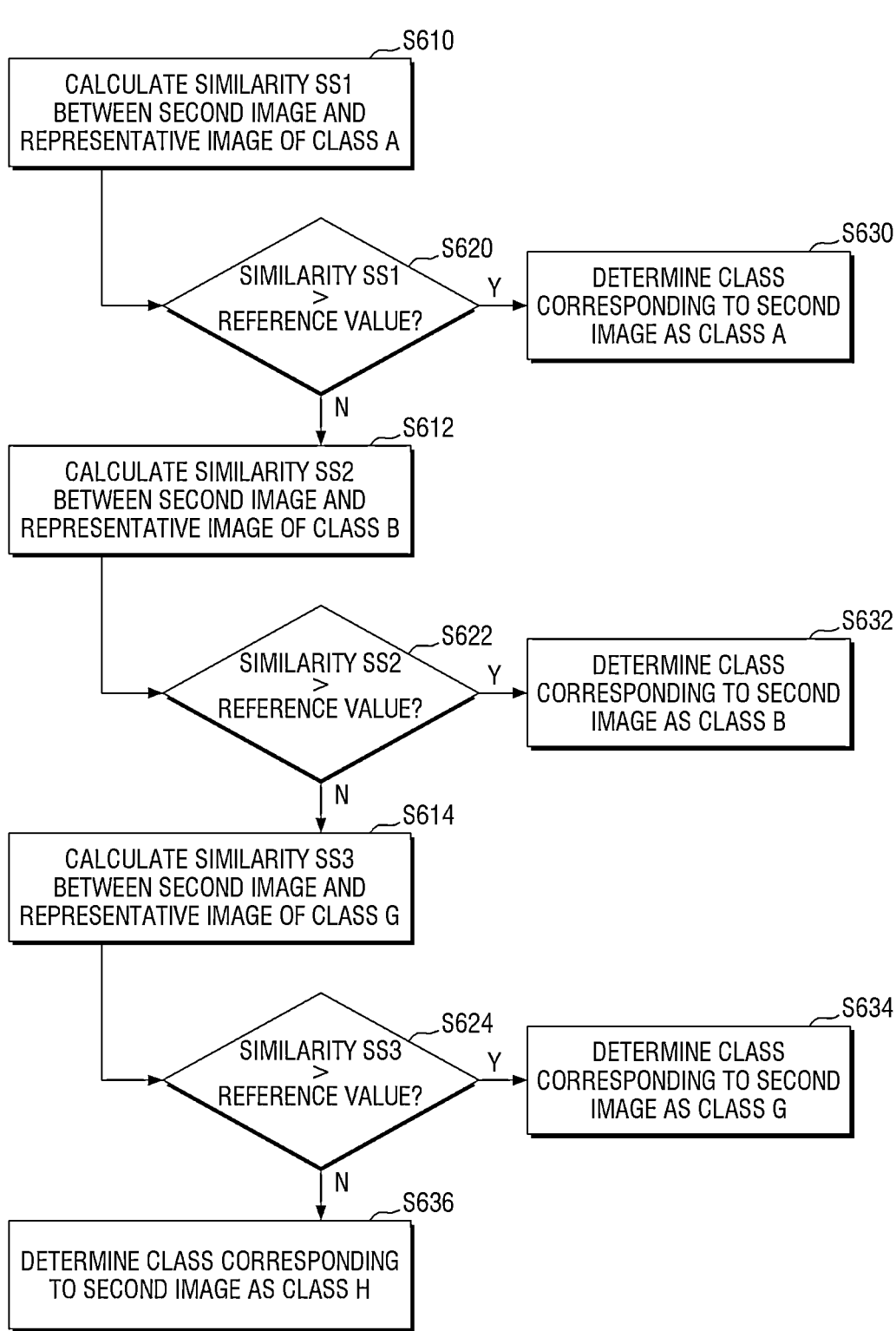
FIG. 5 is a diagram for describing another example of step S60 of FIG. 1.

FIG. 5 is a diagram for describing another example of step S60 of FIG. 1. For convenience of description, the points different from those described with reference to FIGS. 1 to 4 will be mainly described.

In FIG. 4, when the prediction class of the second image is different from the preset class (i.e., the second class), similarity (that is, the first similarity) between the representative image of the second class (e.g., class D) and the second image is calculated, and the similarity (i.e., the second similarity) between the representative image of the prediction class (e.g., class B) and the second image is calculated.

On the other hand, in FIG. 5, when the prediction class of the second image is different from the preset class (i.e., the second class), it is determined whether the second image can be classified into each of a plurality of classes (class A to class H). That is, it is also determined whether the second image can belong to a class other than the preset class (class D) and the prediction class (class B).

Specifically, the similarity SS1 between the second image and the representative image of class A is calculated (S610).

For example, the sum of SSIM and PSNR may be used as the similarity SS1. That is, the SSIM between the second image and the representative image of class A and the PSNR between the second image and the representative image of class A are calculated, and the calculated SSIM and PSNR are summed to calculate the similarity SS1.

Next, it is determined whether the similarity SS1 is greater than a reference value (S620). For example, the reference value may be 0.8, but is not limited thereto. The reference value may be determined through a test or the like.

If the similarity SS1 is greater than the reference value (see Y in S620), the class corresponding to the second image is determined as class A (S630).

If the similarity SS1 is smaller than the reference value (see N in S620), the similarity SS2 between the second image and the representative image of class B is calculated (S612).

For example, the sum of SSIM and PSNR may be used as the similarity SS2. That is, the SSIM between the second image and the representative image of the class B and the PSNR between the second image and the representative image of class B are calculated, and the calculated SSIM and PSNR are summed to calculate the similarity SS2.

Next, it is determined whether the similarity SS2 is greater than a reference value (S622).

If the similarity SS2 is greater than the reference value (see Y in S622), the class corresponding to the second image is determined as class B (S632).

If the similarity SS2 is smaller than the reference value (see N in S622), the similarity between the second image and the representative image of class C is calculated.

In a similar manner, the similarity between the second image and the representative image of class C is calculated, the similarity between the second image and the representative image of class D is calculated, and the similarity between the second image and the representative image of class E is calculated, and the similarity between the second image and the representative image of class F is calculated.

Finally, if it is determined that the second image is also dissimilar to the representative image of class F, the similarity SS3 between the second image and the representative image of class G is calculated (S614).

For example, the sum of SSIM and PSNR may be used as the similarity SS3. That is, the SSIM between the second image and the representative image of class G and the PSNR between the second image and the representative image of class G are calculated, and the calculated SSIM and PSNR are summed to calculate the similarity SS3.

Next, it is determined whether the similarity SS3 is greater than a reference value (S624).

If the similarity SS3 is greater than the reference value (see Y in S624), the class corresponding to the second image is determined as class G (S634).

If the similarity SS3 is smaller than the reference value (see N in S624), the class corresponding to the second image is determined as class H (S636).

The reference values in steps S620, S622, and S624 may be the same as or different from each other.

An example is given for better understanding. It is assumed that the number of second images included in the second image dataset is 2000. Also, it is assumed that there are 100 second images having a different prediction class from a preset class (i.e., the second class) among 2000 second images.

The similarity SS1 between the 100 second images and the representative image of class A is calculated. As a result of calculating the similarity SS1, the class of the ten second images is determined as class A. The similarity SS2 between the remaining 90 (=100−10) second images and the representative image of class B is calculated. As a result of calculating the similarity SS2, the class of the 15 second images is determined as class B. The similarity between the remaining 75 (=90−15) second images and the representative image of class C is calculated. In this way, the similarity SS3 between the remaining 20 second images and the representative image of class G is calculated. According to the similarity SS3 calculation result, the classes of the 12 second images may be determined as class G, and the classes of the 8 second images may be determined as class H.

Figure 6:
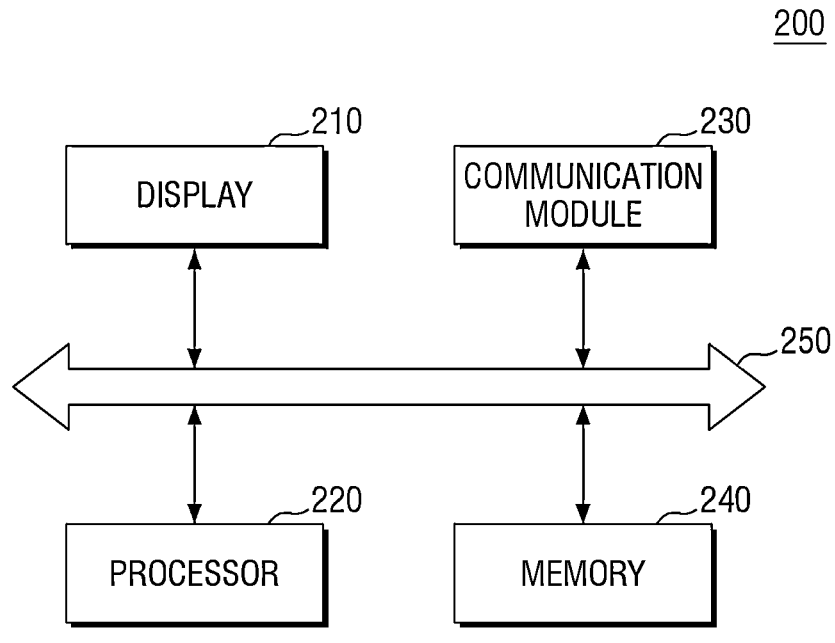
FIG. 6 is a block diagram illustrating an apparatus for performing a method of generating an adaptive training image dataset according to some embodiments of the present invention.

FIG. 6 is a block diagram illustrating an apparatus for performing a method of generating an adaptive training image dataset according to some embodiments of the present invention.

Referring to FIG. 6, an apparatus 200 for performing a method of generating an adaptive training image dataset according to some embodiments of the present invention may comprise a display 210, a processor 220, a communication module 230, a memory 240, a bus 250, an input/output interface, and the like.

By the bus 250, various components such as the display 210, the processor 220, the communication module 230, and the memory 240 may connect and communicate with each other (i.e., transmit control messages and transmit data).

The processor 220 may include one or more of a central processing unit, an application processor, and a communication processor (CP). The processor 220 may, for example, execute an operation or data processing related to control and/or communication of at least one other component of the electronic device 200.

The display 210 may include, for example, a liquid crystal display (LCD), a light emitting diode (LED) display, an organic light emitting diode (OLED) display, or a micro-electromechanical system (MEMS) display, or an electronic paper display. The display 210 may display, for example, various types of content (e.g., text, images, videos, icons, and/or symbols, etc.) to the user. The display 210 may include a touch screen, and may receive, for example, a touch using an electronic pen or a part of the user's body, a gesture, a proximity, or a hovering input.

Memory 240 may include volatile memory (e.g., DRAM, SRAM, or SDRAM) and/or non-volatile memory (e.g., one time programmable ROM (OTPROM), PROM, EPROM, EEPROM, mask ROM, flash ROM, flash memory, PRAM, RRAM, MRAM, hard drive, or solid state drive (SSD)). The memory 240 may include an internal memory and/or an external memory. The memory 240 may store, for example, commands or data related to at least one other component of the electronic device 200. In addition, the memory 240 may store software and/or programs.

Meanwhile, the memory 240 stores instructions for performing the above-described method for generating an adaptive training image dataset.

For example, the memory 240 stores the first image dataset and the second image dataset. The first image dataset includes a plurality of first images and a first class corresponding to each of the plurality of first images, and the second image dataset includes a plurality of second images and a second class corresponding to each of the plurality of second images.

In addition, the memory 240 performs a learning algorithm on the first image dataset to generate a first learning model, inputs the second image to the first learning model to obtain a prediction class corresponding to the second image, and if the second class corresponding to the second image is different from the prediction class, updates the second image dataset by determining which class of image the second image is similar to, and updating the class corresponding to the second image to the third class according to the determination result, and generates a second learning model by performing a learning algorithm on the first image dataset and the updated second image dataset.

Here, determining which class of image the second image is similar to comprises, as described in FIG. 4, calculating the first similarity between the representative image of the second class and the second image, calculating the second similarity between the representative image of the prediction class and the second image, and comparing the first similarity with the second similarity. If the first similarity is greater than the second similarity, the selected third class becomes the prediction class. And, if the second similarity is greater than the first similarity, the selected third class maintains the second class.

Alternatively, determining which class of image the second image is similar to may comprise calculating a plurality of similarities between each of the plurality of representative images and the second image, as described in FIG. 5. Each of the plurality of representative images corresponds to a different class.

Although embodiments of the present invention have been described with reference to the above and the accompanying drawings, those skilled in the art, to which the present invention pertains, can understand that the present invention may be practiced in other specific forms without changing its technical spirit or essential features. Therefore, it should be understood that the embodiments described above are illustrative in all respects and not limiting.

What is claimed is:

1. A method for generating an adaptive training image dataset comprising:

preparing a first image dataset, wherein the first image dataset comprises:

a plurality of first ink ejection images, and for each of the plurality of first ink ejection images, a first class of a defect type that appears in each respective one of the plurality of first ink ejection images;

performing a learning algorithm on the first image dataset to generate a first learning model;

preparing a second image dataset, wherein the second image dataset comprises:

a plurality of second ink ejection images, and for each of the plurality of second ink ejection images, a second class of the defect type appearing in each respective one of the plurality of second ink ejection images;

inputting the plurality of second ink ejection images of the second image dataset into the first learning model to obtain, for each of the plurality of second ink ejection images, a prediction class for the defect type appearing in each respective one of the plurality of second ink ejection images, wherein the prediction class, the first class, and the second class are all selected from a set of predefined defect type classes;

for a first portion of the plurality of second ink ejection images where the prediction class generated by the first learning model is different from the second class, making a first determination as to whether the defect type in each respective one of the first portion of the plurality of second ink ejection images is more similar to the second class, the prediction class, or another class among the set of predefined defect type classes;

updating the second image dataset to obtain an updated second image dataset by updating the second class associated with each of the first portion of the plurality of second ink ejection images according to a result of the first determination; and performing a learning algorithm on the first image dataset and the updated second image dataset to generate a second learning model, wherein making the first determination comprises, for each first portion second ink ejection image making up the first portion of the plurality of second ink ejection images:

sequentially comparing a first portion second ink ejection image to a plurality of representative images in a predetermined order starting from a first representative image of the plurality of representative images to a last representative image of the plurality of representative images, each of the representative images being associated with only one of the defect types included in the set of predefined defect type classes;

stopping the sequential comparing when a similarity between the first portion second ink ejection image and one of the plurality of representative images is determined to exceed a predetermined reference value; and after stopping the sequential comparing, identifying the defect type, and a class among the set of predefined defect type classes associated with the defect type, associated with the one of the plurality of representative images.

2. The method of claim 1, wherein the sequentially comparing comprises calculating a SSIM (Structural Similarity Index Map) as the similarity.

3. The method of claim 1, wherein the sequentially comparing comprises calculating a PSNR (Peak Signal-to-Noise Ratio) as the similarity.

4. The method of claim 1, wherein the sequentially comparing comprises calculating a weighted sum of SSIM and PSNR as the similarity.

5. The method of claim 1, wherein the first class of the defect type and the second class of the defect type are manually determined by an operator.

6. An apparatus comprising:
a processor; and
a memory, wherein the memory stores a first image dataset and a second image dataset, wherein the first image dataset comprises:
a plurality of first ink ejection images, and
for each of the plurality of first ink ejection images, a first class of a defect type that appears in each respective one of the plurality of first ink ejection images, wherein the second image dataset comprises:
a plurality of second ink ejection images, and
for each of the plurality of second ink ejection images, a second class of the defect type appearing in each respective one of the plurality of second ink ejection images, and wherein the memory stores instructions that cause the processor to perform operations comprising:

performing a learning algorithm on the first image dataset to generate a first learning model;

inputting the plurality of second ink ejection images of the second image dataset into the first learning model to obtain, for each of the plurality of second ink ejection images, a prediction class for the defect type appearing in each respective one of the plurality of second ink ejection images, wherein the prediction class, the first class, and the second class are all selected from a set of predefined defect type classes;

for a first portion of the plurality of second ink ejection images where the prediction class generated by the first learning model is different from the second class, making a first determination as to whether the defect type in each respective one of the first portion of the plurality of second ink ejection images is more similar to the second class, the prediction class, or another class among the set of predefined defect type classes;

updating the second image dataset to obtain an updated second image dataset by updating the second class associated with each of the first portion of the plurality of second ink ejection images according to a result of the first determination; and performing a learning algorithm on the first image dataset and the updated second image dataset to generate a second learning model, wherein making the first determination comprises, for each first portion second ink ejection image making up the first portion of the plurality of second ink ejection images:

sequentially comparing a first portion second ink ejection image to a plurality of representative images in a predetermined order starting from a first representative image of the plurality of representative images to a last representative image of the plurality of representative images, each of the representative images being associated with only one of the defect types included in the set of predefined defect type classes;

stopping the sequential comparing when a similarity between the first portion second ink ejection image and one of the plurality of representative images is determined to exceed a predetermined reference value; and after stopping the sequential comparing, identifying the defect type, and a class among the set of predefined defect type classes associated with the defect type, associated with the one of the plurality of representative images.

7. The apparatus of claim 6, wherein the sequentially comparing comprises calculating a weighted sum of a SSIM (Structural Similarity Index Map) and a PSNR (Peak Signal-to-Noise Ratio) as the similarity.

8. The apparatus of claim 6, wherein the first class of the defect type and the second class of the defect type are manually determined by an operator.

\* \* \* \* \*